(12) United States Patent
Vehra et al.

(10) Patent No.: US 11,905,826 B2
(45) Date of Patent: Feb. 20, 2024

(54) CLOCK CALIBRATION OF REMOTE SYSTEMS BY ROUNDTRIP TIME

(71) Applicant: Halliburton Energy Services, Inc., Houston, TX (US)

(72) Inventors: Imran Sharif Vehra, Kingwood, TX (US); Zinovy B. Krugliak, Houston, TX (US); Randal T. Beste, Katy, TX (US); Matthew Chase Griffing, Kingwood, TX (US); Christopher A. Golla, Kingwood, TX (US); Wenhao Chen, Houston, TX (US); Rameez Balagamwala, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/346,416

(22) PCT Filed: May 31, 2018

(86) PCT No.: PCT/US2018/035459
§ 371 (c)(1),
(2) Date: Apr. 30, 2019

(87) PCT Pub. No.: WO2019/231458
PCT Pub. Date: Dec. 5, 2019

(65) Prior Publication Data
US 2021/0372273 A1    Dec. 2, 2021

(51) Int. Cl.
*E21B 47/12*         (2012.01)
*G01V 3/34*          (2006.01)
(Continued)

(52) U.S. Cl.
CPC ............... *E21B 47/12* (2013.01); *G01V 3/34* (2013.01); *G01V 11/002* (2013.01); *G01V 13/00* (2013.01); *G01V 2200/12* (2013.01)

(58) Field of Classification Search
CPC ........ E21B 47/12; G01V 3/34; G01V 11/002; G01V 13/00; G01V 2200/12
See application file for complete search history.

(56) References Cited

U.S. PATENT DOCUMENTS

| 5,624,001 A | 4/1997 | Evans |
| 6,766,854 B2 * | 7/2004 | Ciglenec ................. E21B 29/06 |
| | | 166/250.11 |

(Continued)

FOREIGN PATENT DOCUMENTS

| WO | 2008081373 | 7/2008 | |
| WO | WO-2017099710 A1 * | 6/2017 | ............... G01V 3/26 |
| WO | 2019004999 | 1/2019 | |

OTHER PUBLICATIONS

ISRWO International Search Report and Written Opinion for PCT/US2018/035459 dated Feb. 27, 2019.

(Continued)

*Primary Examiner* — Franklin D Balseca
(74) *Attorney, Agent, or Firm* — Benjamin Ford; C. Tumey Law Group PLLC

(57) ABSTRACT

A method for calibrating a downhole tool may comprise disposing a downhole tool in a borehole, transmitting a signal from a master module disposed on the first device to a module disposed on the second device, transmitting a return signal from the module to the master module, receiving the return signal with the master module, measuring a tone enabled delay for the signal to travel from the master module to the module, and determining a time delay of a return signal to travel from the module to the master module. A well measurement system may comprise a downhole tool. The downhole tool may further comprise a first device and a master module disposed on the first device, wherein the master module may comprise a master transmitter and a master receiver. In examples, the downhole tool may further (Continued)

comprise a second device and a module disposed on the second device.

21 Claims, 7 Drawing Sheets

(51) Int. Cl.
*G01V 11/00* (2006.01)
*G01V 13/00* (2006.01)

(56) References Cited

U.S. PATENT DOCUMENTS

| | | | |
|---|---|---|---|
| 7,650,388 B2* | 1/2010 | Rodriguez | H04L 1/188 |
| | | | 709/224 |
| 8,009,510 B2* | 8/2011 | Chang | G01V 1/42 |
| | | | 367/27 |
| 8,521,091 B2* | 8/2013 | Miscopein | H04W 64/00 |
| | | | 455/67.11 |
| 9,246,615 B2* | 1/2016 | Ellegard | H04J 3/0682 |
| 2005/0285645 A1 | 12/2005 | Hall et al. | |
| 2010/0302060 A1 | 12/2010 | Montgomery et al. | |
| 2014/0354446 A1 | 12/2014 | Nakayama et al. | |
| 2016/0032714 A1 | 2/2016 | Rao et al. | |

OTHER PUBLICATIONS

GCC Office Action for Application No. GC 201937295 dated Apr. 17, 2020.

* cited by examiner

CLOCK CALIBRATION OF REMOTE SYSTEMS BY ROUNDTRIP TIME

BACKGROUND

Boreholes drilled into subterranean formations may enable recovery of desirable fluids (e.g., hydrocarbons) using a number of different techniques. A logging tool may be employed in subterranean operations to determine borehole and/or formation properties. As boreholes get deeper, logging tools may become longer and more sophisticated. Measurements by sensors on the logging tool may provide information that may allow an operator to determine borehole and/or formation properties. However, a logging tool may stretch over a large area and further include large spacing and increased mechanical variance between sensors, wherein the sensors may include transmitters and receivers. This may greatly complicate the relation between raw responses and formation properties and lead to inaccurate interpretation from recordings, which may skew results of borehole and formation properties.

BRIEF DESCRIPTION OF THE DRAWINGS

These drawings illustrate certain aspects of the presented disclosure and should not be used to limit or define the disclosure.

DETAILED DESCRIPTION

The present disclosure is directed to downhole tools and more particularly to systems and methods for clock calibration between modules of a system. As disclosed below, modules including sampling clocks disposed on device of a downhole tool may be synchronized together, preventing measurements from being skewed across each device. For example, resistivity tools and similar versions such as deep reading look ahead tools may be disposed across a bottom hole assembly with different intervals of length between individual modules disposed on the downhole tool. Such devices may perform and/or operate efficiently after synchronization utilizing local analog to digital converters and digital signal processors ("DSPs"). Synchronization may account and/or correct in real time recorded data for inaccuracies due to propagation delay, phase shifts because of rejection and bandpass filters, and temperature effects. It should be noted that synchronization between devices may change based on the placement of the devices in the bottom hole assembly. In examples, employing a roundtrip method for synchronization, discussed below, may adjust for such errors during operations of a downhole tool disposed within a borehole. This may be done on power up, periodically, and/or when tool temperatures change. For example, the roundtrip method may measure the time delay between at least two sampling clocks and may adjust a phase measurement (in some instances) according to the time delay:

Additionally, this disclosure may disclose an in-situ calibration of synchronizing internal clocks between devices of a system that may be separated by distance and/or other devices. In-situ calibration may operate by measuring roundtrip delay. Round trip delay may be the measurement from the transmission of a signal, which may also be described as a tone, from a transmitter on a first device to a receiver on a second device and then a return signal transmitted from the second device back to a receiver on the first device. The roundtrip delay may be utilized to adjust for phase error in logging tools such as VDR resistivity tools and/or similar tools which may be disposed on a downhole tool. This may simplify tool placement on the downhole tool by automating phase calibration of the clock. In addition, synchronization may maintain the accuracy of internal clocks of different devices by periodically performing the roundtrip calibration or when the downhole temperature changes that may affect the propagation delay of an internal clock.

Figure 1:
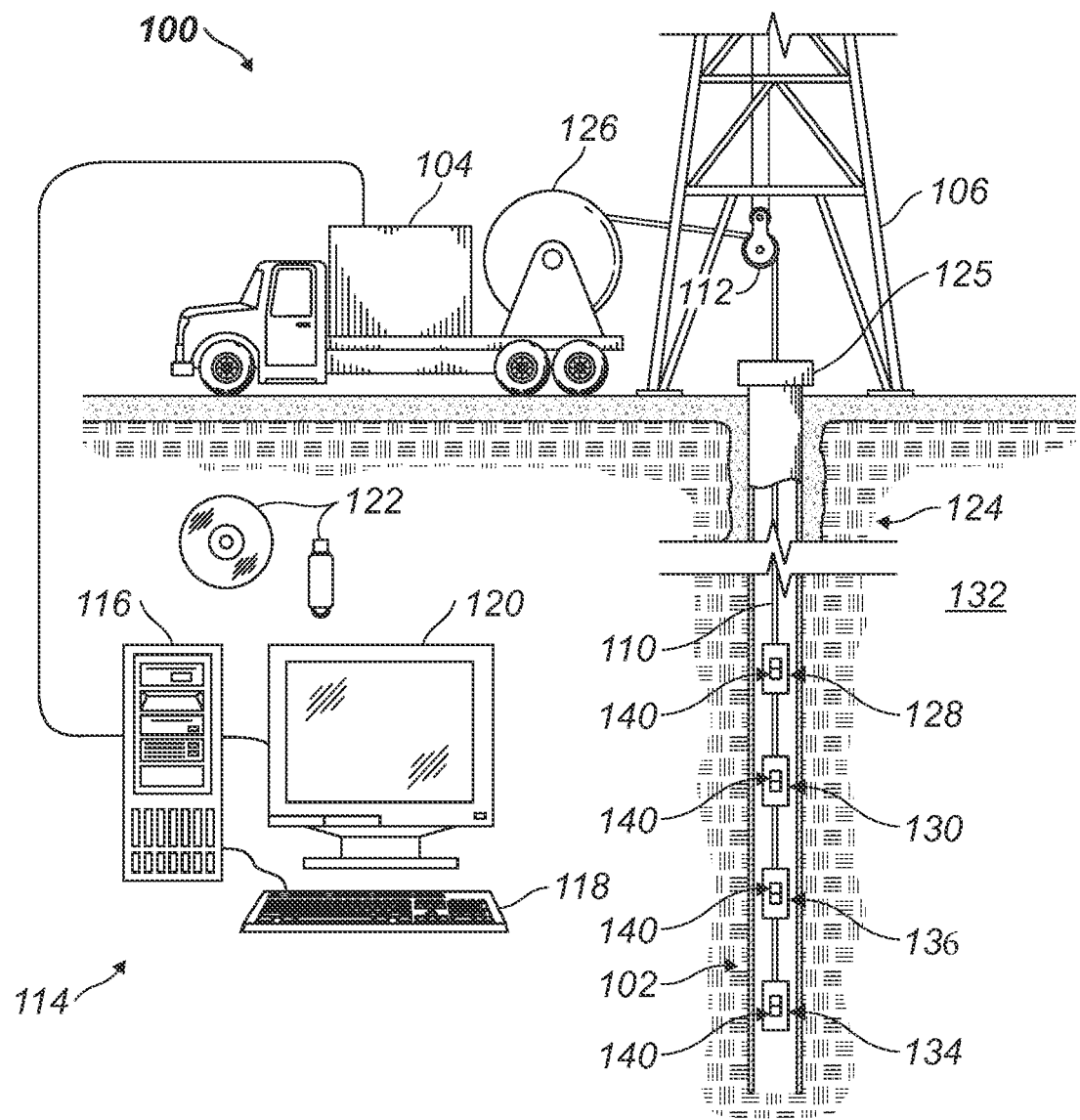
FIG. 1 illustrates an example of a well measurement system.

FIG. 1 illustrates a cross-sectional view of a well measurement system 100. As illustrated, well measurement system 100 may comprise downhole tool 102 attached a vehicle 104. In examples, it should be noted that downhole tool 102 may not be attached to a vehicle 104. For example, in offshore or other operations, downhole tool 102 may be attached to a winch (not shown) or other suitable device. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, downhole tractor, or the like. In some embodiments, conveyance 110 may provide mechanical suspension, as well as electrical and/or optical connectivity, for downhole tool 102. Conveyance 110 may comprise, in some instances, a plurality of electrical conductors and/or a plurality of optical conductors extending from vehicle 104, which may provide power and telemetry. In examples, an optical conductor may utilize a battery and/or a photo conductor to harvest optical power transmitted from surface 108. Conveyance 110 may comprise an inner core of seven electrical conductors covered by an insulating wrap. An inner and outer steel armor sheath may be wrapped in a helix in opposite directions around the conductors. The electrical and/or optical conductors may be used for communicating power and telemetry between vehicle 104 and downhole tool 102. Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. Without limitation, downhole tool 102 may be connected to and/or controlled by information handling system 114, which may be disposed on surface 108. Without limitation, information handling system 114 may be disposed downhole in downhole tool 102. Processing of information recorded may occur down hole and/or on surface 108. Processing occurring downhole may be transmitted to surface 108 to be recorded, observed, and/or further analyzed. In examples, all processing may occur downhole or on surface 108. Additionally, at least a part of processing may occur downhole and/or at least a part of processing may occur on surface 108. Additionally, information recorded on information handling system 114 that may be disposed downhole may be stored downhole tool 102 may be brought to surface 108. In some embodiments, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

As illustrated, downhole tool 102 may be disposed in borehole 124. Borehole 124 may extend from a wellhead 125 into a subterranean formation 132 from a surface 108. Generally, borehole 124 may include horizontal, vertical, slanted, curved, and other types of borehole geometries and orientations. Borehole 124 may be cased or uncased. In examples, borehole 124 may include a metallic member. By way of example, the metallic member may be a casing, liner, tubing, or other elongated steel tubular disposed in borehole 124. As illustrated, borehole 124 may extend through subterranean formation 132. Borehole 124 may extend generally vertically into the subterranean formation 132, as illustrated, however borehole 124 may extend at an angle through subterranean formation 132, such as horizontal and slanted boreholes. For example, although FIG. 1 illustrates a vertical or low inclination angle well, high inclination angle or horizontal placement of the well and equipment may be possible. It should further be noted that while FIG. 1 generally depicts land-based operations, those skilled in the art may recognize that the principles described herein are equally applicable to subsea operations that employ floating or sea-based platforms and rigs, without departing from the scope of the disclosure.

Systems and methods of the present disclosure may be implemented, at least in part, with information handling system 114. While shown at surface 108, information handling system 114 may also be located at another location, such as remote from borehole 124 or downhole. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a personal computer 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as various input and output (I/O) devices, such as a keyboard 118, a mouse, and a video display 120. Information handling system 114 may also include one or more buses operable to transmit communications between the various hardware components. Furthermore, video display 120 may provide an image to a user based on activities performed by personal computer 116. For example, producing images of geological structures created from recorded signals. By way of example, video display unit may produce a plot of depth versus the two cross-axial components of the gravitational field and versus the axial component in borehole coordinates. The same plot may be produced in coordinates fixed to the Earth, such as coordinates directed to the North, East, and directly downhole (Vertical) from the point of entry to the borehole. A plot of overall (average) density versus depth in borehole or vertical coordinates may also be provided. A plot of density versus distance and direction from the borehole versus vertical depth may be provided. It should be understood that many other types of plots are possible when the actual position of the measurement point in North, East, and Vertical coordinates is taken into account. Additionally, hard copies of the plots may be produce in paper logs for further use.

For example, a resistivity log may be a paper log that characterizes rock or sediment in a borehole by plotting measured electrical resistivity. Resistivity is a fundamental material property which represents how strongly a material opposes the flow of electric current. In these logs, resistivity is measured with at least one electrical probe to eliminate the resistance of contact leads. The log may be produced from downhole tools run in holes containing electrically conductive mud or water.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Information handling system 114 may produce a well log, which may include a continuous measurement of formation properties to infer properties and make decisions about drilling and production operations. The record of measurements, typically a long trip of paper, may be identified as a "log." Formations properties that may be recorded on the log may include electrical properties such as resistivity and conductivity measurements at different frequencies. A log may be used for well planning, (e.g., to design a desired path of borehole 124). Additionally, they may be used for planning the placement of drilling systems within a prescribed area. This may allow for the most efficient drilling operations to reach a subsurface structure. During drilling operations, measurements taken within borehole 124 may be used to adjust the geometry of borehole 124 in real time to reach a geological target. Measurements collected from borehole 124 may also be used to refine the log.

In examples downhole tool 102 may comprise a plurality of different device suitable for any downhole measurement and/or imaging of borehole 124 or subterranean formation 132. Without limitation, suitable devices may be sonic tools, corrosion detection tools, resistivity tools (such as very deep resistivity tools), samplers, imaging tools, and/or the like. As disclosed below, any suitable tool disclosed above may be referred to a device. For example, a first device 128, a second device 130, a third device 134, and/or a fourth device 136, which may be disposed on downhole tool 102 in any suitable order. For example, any first device 128 may be disposed at a distance from second device 130 or may be disposed adjacent to second device 130. Additionally, any tool or other device may be disposed between first device 128 and second device 130 but may not comprise module 140. Thus, an operator may select different devices disposed on downhole tool 102 for clock calibration. Furthermore, there may be any number of devices disposed on downhole tool 102 and each device may be disposed along conveyance 110 at any suitable location. It should be noted that there may be any suitable distance between each device. Each device may perform any number and type of operations and/or functions within borehole 124. For example, a device may measure different properties of borehole 124 and/or subterranean formation 132. Other devices may sample fluid within borehole 124. During measurements, operation, and/or function, each device may be synchronized with each other to prevent skewed measurements across downhole tool 102. As illustrated in FIG. 1, first device 128, a second device 130, a third device 134, and/or a fourth device 136 may comprise module 140. Module 140 may comprise a synchronization device. Each synchronization device may communicate with other synchronization devices, which may prevent skewing data across all devices disposed on downhole tool 102.

Figure 2:
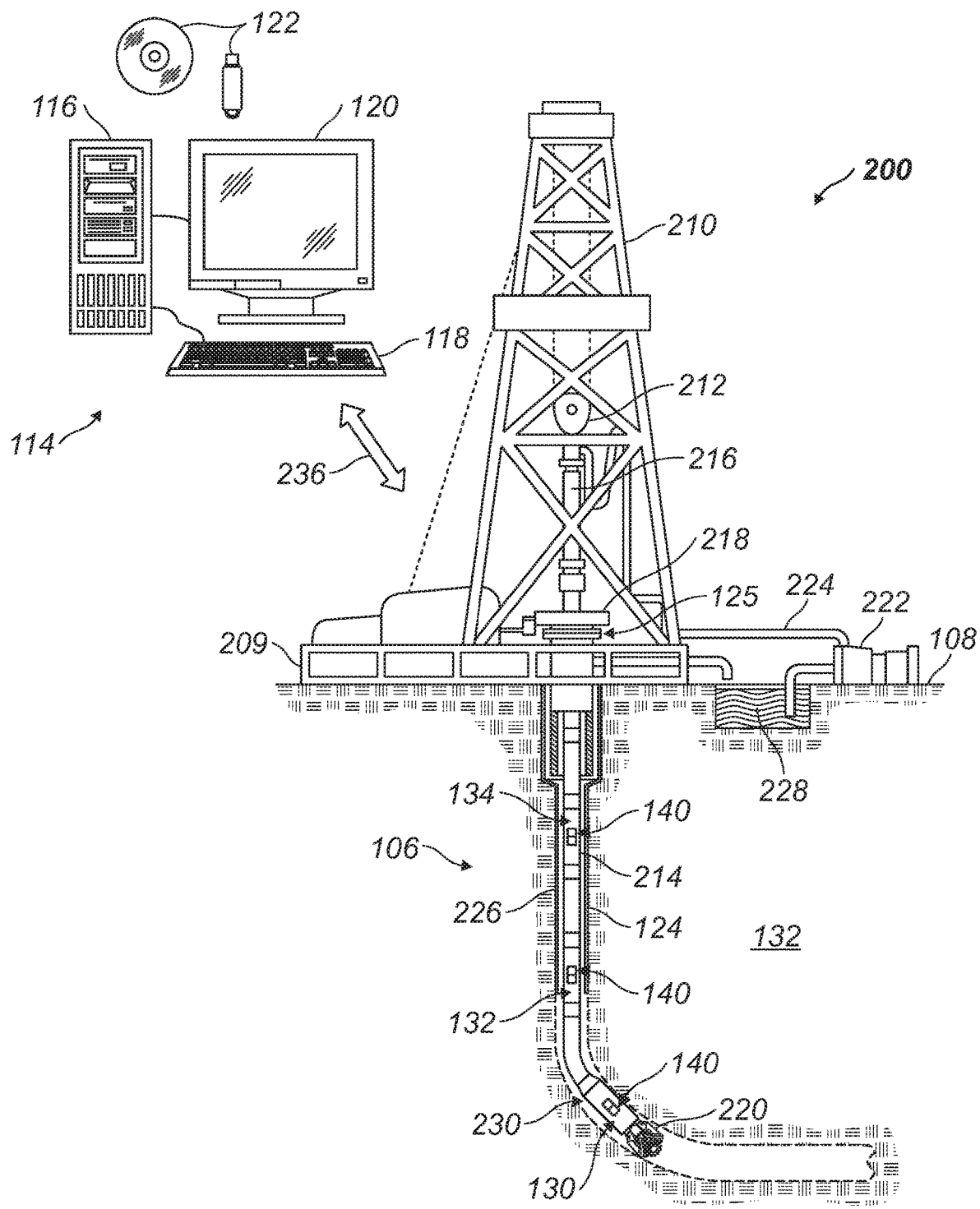
FIG. 2 illustrates another example of a well measurement system.

FIG. 2 illustrates a drilling system 200. As illustrated, borehole 124 may extend from a wellhead 125 into a subterranean formation 132 from a surface 108. Generally, borehole 124 may include horizontal, vertical, slanted, curved, and other types of borehole geometries and orientations. As previously described, borehole 124 may be cased or uncased. In examples, borehole 124 may include a metallic member. As illustrated, borehole 124 may extend through subterranean formation 132. It should be noted that while FIG. 2 generally depict a land-based operations, those skilled in the art may recognize that the principles described herein are equally applicable to subsea operations that employ floating or sea-based platforms and rigs, without departing from the scope of the disclosure.

As illustrated, a drilling platform 209 may support a derrick 210 having a traveling block 212 for raising and lowering drill string 214. Drill string 214 may include, but is not limited to, drill pipe and coiled tubing, as generally known to those skilled in the art. A kelly 216 may support drill string 214 as it may be lowered through a rotary table 218. A drill bit 220 may be attached to the distal end of drill string 214 and may be driven either by a downhole motor and/or via rotation of drill string 214 from surface 108. Without limitation, drill bit 220 may include, roller cone bits, PDC bits, natural diamond bits, any hole openers, reamers, coring bits, and the like. As drill bit 220 rotates, it may create and extend borehole 124 that penetrates various subterranean formations 206. A pump 222 may circulate drilling fluid through a feed pipe 224 through kelly 216, downhole through interior of drill string 214, through orifices in drill bit 220, back to surface 108 via annulus 226 surrounding drill string 214, and into a retention pit 228.

With continued reference to FIG. 2, drill string 214 may begin at wellhead 204 and may traverse borehole 124. Drill bit 220 may be attached to a distal end of drill string 214 and may be driven, for example, either by a downhole motor and/or via rotation of drill string 214 from surface 108. Drill bit 220 may be a part of bottom hole assembly 230 at distal end of drill string 214. As will be appreciated by those of ordinary skill in the art, bottom hole assembly 230 may be a measurement-while drilling (MWD) or logging-while-drilling (LWD) system.

Without limitation, bottom hole assembly 230 may be connected to and/or controlled by information handling system 114, which may be disposed on surface 108. Without limitation, information handling system 114 may be disposed down hole in bottom hole assembly 230. Processing of information recorded may occur down hole and/or on surface 108. Processing occurring downhole may be transmitted to surface 108 to be recorded, observed, and/or further analyzed. In examples, all processing may occur downhole or on surface 108. Additionally, at least a part of processing may occur downhole and/or at least a part of processing may occur on surface 108. Additionally, information recorded on information handling system 114 that may be disposed downhole may be stored until bottom hole assembly 230 may be brought to surface 108. In examples, information handling system 114 may communicate with bottom hole assembly 230 through a communication line (not illustrated) disposed in (or on) drill string 214. In examples, wireless communication may be used to transmit information back and forth between information handling system 114 and bottom hole assembly 230. Information handling system 114 may transmit information to bottom hole assembly 230 and may receive as well as process information recorded by bottom hole assembly 230. In examples, a downhole information handling system (not illustrated) may include, without limitation, a microprocessor or other suitable circuitry, for estimating, receiving and processing signals from bottom hole assembly 230. Downhole information handling system (not illustrated) may further include additional components, such as memory, input/output devices, interfaces, and the like. In examples, while not illustrated, bottom hole assembly 230 may include one or more additional components, such as analog-to-digital converter, filter and amplifier, among others, that may be used to process the measurements of bottom hole assembly 230 before they may be transmitted to surface 108. Alternatively, raw measurements from bottom hole assembly 230 may be transmitted to surface 108.

Any suitable technique may be used for transmitting signals from bottom hole assembly 230 to surface 108, including, but not limited to, wired pipe telemetry, mud-pulse telemetry, acoustic telemetry, and electromagnetic telemetry. While not illustrated, bottom hole assembly 230 may include a telemetry subassembly that may transmit telemetry data to surface 108. At surface 108, pressure transducers (not shown) may convert the pressure signal into electrical signals for a digitizer (not illustrated). The digitizer may supply a digital form of the telemetry signals to information handling system 114 via a communication link 236, which may be a wired or wireless link. The telemetry data may be analyzed and processed by information handling system 114.

As illustrated, communication link 236 (which may be wired or wireless, for example) may be provided that may transmit data from bottom hole assembly 230 to an information handling system 114 at surface 108. Information handling system 114 may include a personal computer 116, a video display 120, a keyboard 118 (i.e., other input devices), and/or non-transitory computer-readable media 122 (e.g., optical disks, magnetic disks) that can store code representative of the methods described herein. In addition to, or in place of processing at surface 108, processing may occur downhole.

Well measurement system 100 may be disposed on drilling system 200. For example, bottom hole assembly 230 may comprise a plurality of different devices. For example, a first device 128, a second device 130, a third device 134, a fourth device 136, and/or more may be disposed on bottom hole assembly 230. Furthermore, there may be any number of devices disposed on downhole tool 102 and each device may be disposed along conveyance 110 at any suitable location. It should be noted that there may be any suitable distance between each device. Each device may perform any number and type of operations and/or functions within borehole 124. For example, a device may measure different properties of borehole 124 and/or subterranean formation 132. Other devices may sample fluid within borehole 124. During measurements, operation, and/or function, each device may be synchronized with each other to prevent skewed measurements across downhole tool 102. As illustrated in FIG. 1, first device 128, a second device 130, a third device 134, and/or a fourth device 136, may comprise module 140. Module 140 may comprise a synchronization device. Each synchronization device may communicate with other synchronization devices, which may prevent skewing data across all devices disposed on downhole tool 102.

First device 128, a second device 130, a third device 134, a fourth device 136, and/or the like may communicate with each other to perform measurements of the properties in borehole 124, borehole 124, and/or subterranean formation 132. In examples, first device 128 may control the measurement and/or synchronization operations of downhole tool 102. It should be noted that second device 130, third device 134, fourth device 136, and/or the like may also control the measurement and/or synchronization operations of downhole tool 102.

Figure 3:
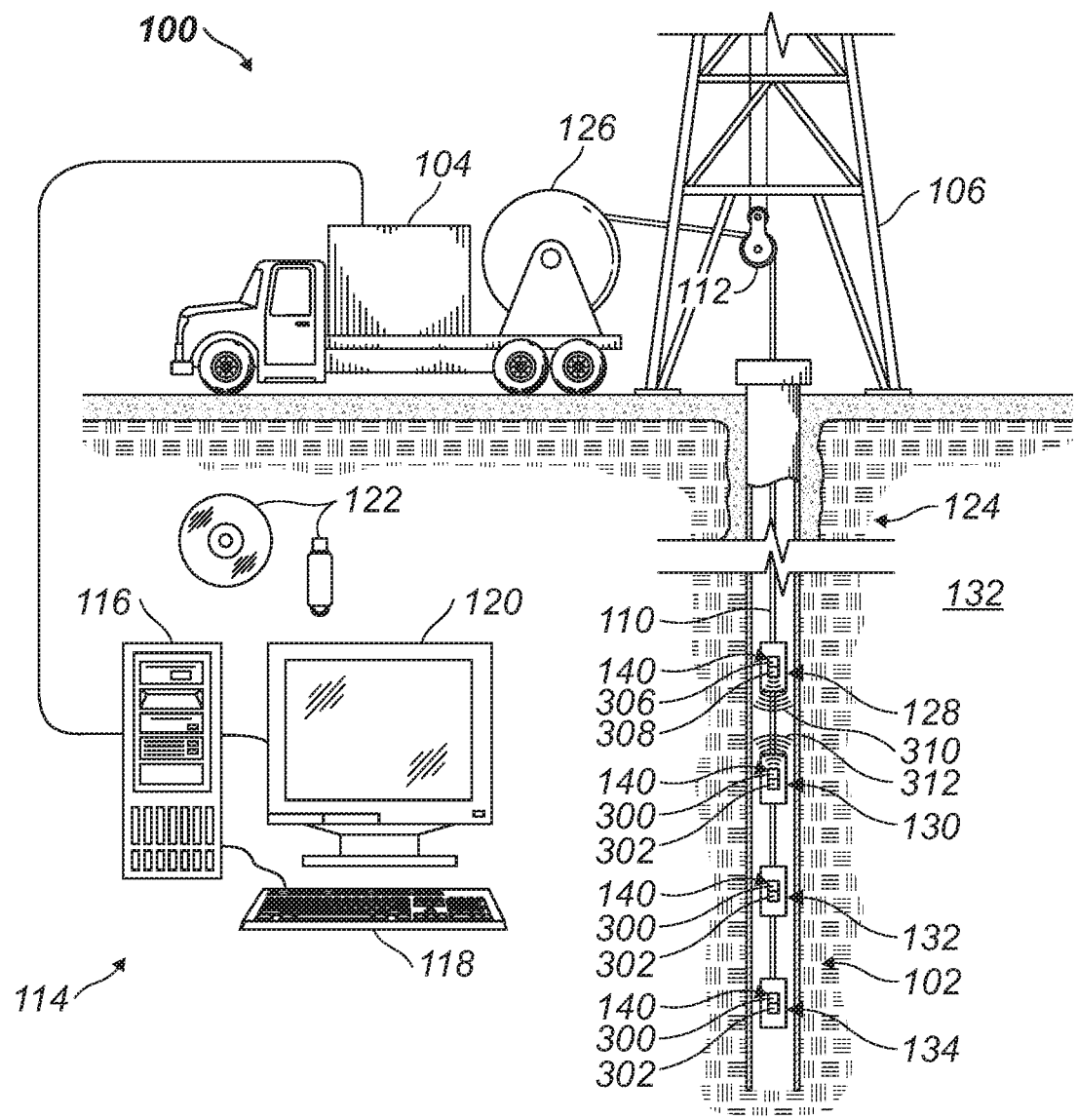
FIG. 3 illustrates communication between a master module and a module in a well measurement system.

FIG. 3 illustrates well measurement system 100. As illustrated, well measurement system 100 may include a downhole tool 124 that may be disposed in borehole 124. Downhole tool 124 may include a first device 128, a second device 130, a third device 134, and a fourth device 136, in which modules 140 disposed on each device may be in communication with each other. Each module 140 may comprise a transmitter 300 and a receiver 302. In examples, a module 140 may be designated as a master module 304. Master module 304 may control the synchronization of devices disposed on a downhole tool 102. Master module 304 may comprise a master transmitter 306 and a master receiver 308. Master transmitter 306 and master receiver 308 may control the beginning and ending of the synchronization of devices disposed on a downhole tool 102. As noted above, each device may include a module 140 which may include a transmitter 300 and a receiver 302. This may allow an operator to select any module 140 to be master module 304 and control synchronization in situ. It should be noted that an operator may include an individual, group of individuals, or organization, such as a service company. The relationship between modules 140 may be described as a master and slave relationship, with master module 304 controlling the function and operation of modules 140 (e.g. slave modules) disposed on other devices.

During synchronization operations, a signal with a selected frequency may be utilized for synchronization. In examples, any suitable frequency may be used downhole with downhole tool 102 for clock calibration. It should be noted that a selected frequency may be chosen based on parameters, operations, functions, and tool of downhole tool 102, as well as the environment in borehole 124. Without limitation, a suitable frequency for clock calibration may be about 1 hertz (Hz) to about 1 gigahertz (GHz). Additionally, a suitable frequency for clock calibration may be about 10 Hz to about 1 megahertz (MHz), about 1 MHz to about 3 MHz, or about 2 MHz to about 10 MHz. For example, a suitable frequency for clock calibration may be about 0.8 MHz to about 1.2 MHz or a suitable frequency for clock calibration may be 1 MHz. It should be noted that any frequency may be used which may be out of band with operating frequencies of other devices (to avoid risk of interference) and may not significantly attenuate due to the parasitic impedance of a bus (not illustrated) across downhole tool 102. This frequency may act as the communication channel between master module 304 and any number of other modules 140. When synchronizing, a signal 310, at a selected frequency, may be transmitted from master transmitter 306 disposed on first device 128 to a receiver 302 disposed on second device 130. Receiver 302, disposed on second device 130, may record signal 310 transmitted from master transmitter 306. In examples, signal 310 may comprise frequency that may be a tone sine wave, which may be converted to a square wave at receiver 302. The square wave may then be converted into the required sampling frequency used by the local analog to digital converter. In examples, transmitter 300, (e.g., a tone generator) may be utilized by a device to communicate back to master module 304.

During a roundtrip sequence, module 140 may respond to signal 310 from master module 304 by transmitting return signal 312, a second tone, after a fixed time delay. It should be noted that module 140 may switch between modes during an operation. For example, module 140 may function as a line receiver, which may use receiver 302, and may switch to a line transmitter, which may use transmitter 304. This may allow module 140 to receive a signal during a line receiver mode and switch to transmitter 304 during a line transmitter mode. This functionality may allow for module 140 to actively communicate with master module 304. In examples, master module may also switch been a line receiver mode and a line transmitter mode to communicate with module 140. While this occurs, master transmitter 306 may keep track of a master counter which may measure the total time elapsed during synchronization operations. This synchronization process may be repeated from first device 128, designated for controlling synchronization by the operator, to third device 134, fourth device 136, and/or the like. Synchronization may only occur between master transmitter 306 and one module 140 at a time. Thus, master module 304 may synchronize with each module 140 disposed on each individual device before the synchronization operation may be completed.

Figure 4:
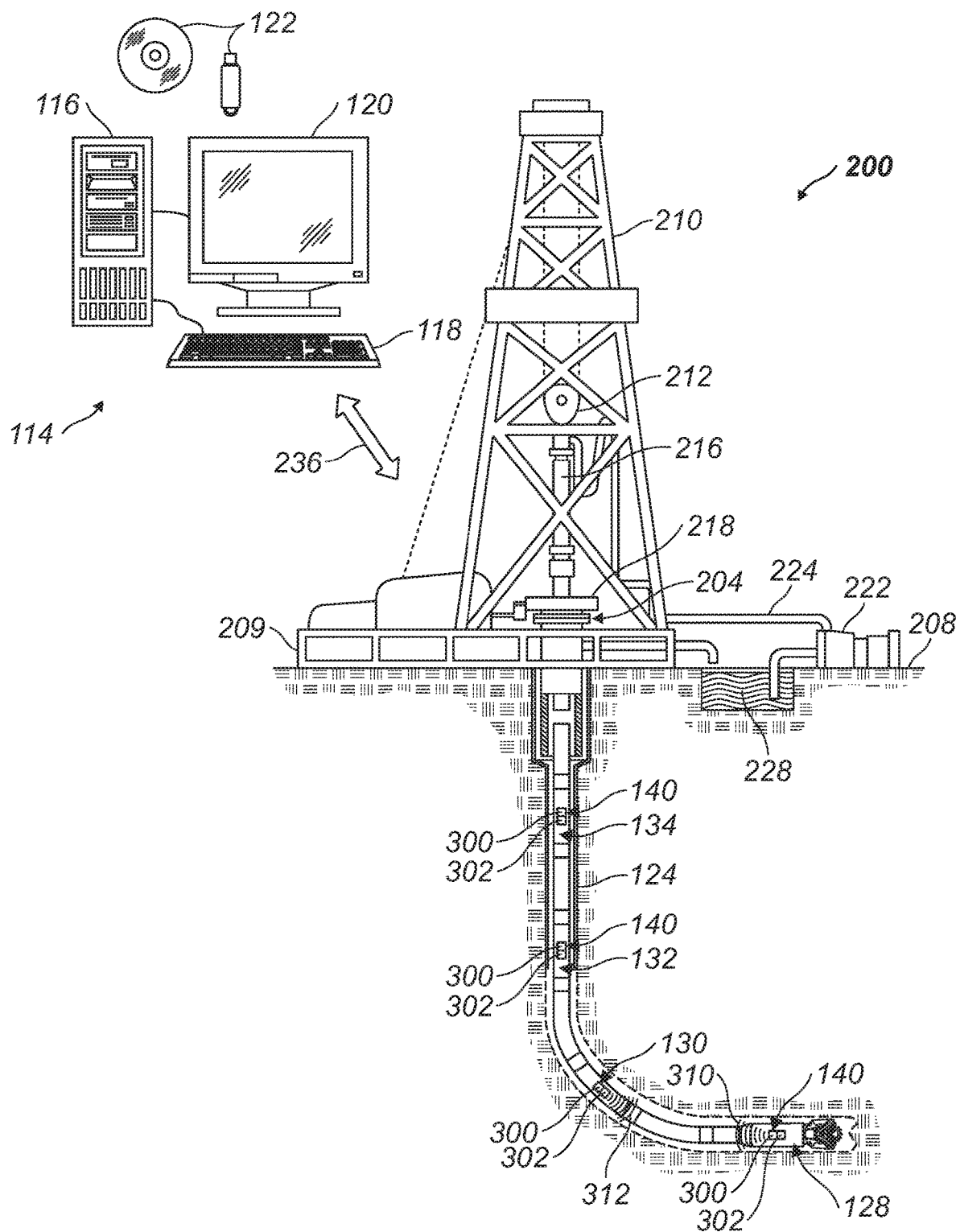
FIG. 4 illustrates another example of communication between a master module and a module in a well measurement system.

FIG. 4 illustrates drilling system 200. As illustrated, drilling system 200 may include a first device 128, a second device 130, a third device 134, and a fourth device 136 disposed in borehole 202, in which modules 140 disposed on each device may be in communication with each other. As discussed above, each module 140 may comprise a transmitter 300 and a receiver 302. In examples, a module 140 may be designated as a master module 304. Master module 304 may control the synchronization of devices disposed on a downhole tool 102. Master module 304 may comprise a master transmitter 306 and a master receiver 308. Master transmitter 306 and master receiver 308 may control the beginning and ending of the synchronization of devices disposed on a downhole tool 102. As noted above, each device may include a module 140 which may include a transmitter 300 and a receiver 302. This may allow an operator [operator definition] to select any module 140 to be master module 304 and control synchronization in situ. The relationship between modules 140 may be described as a master and slave relationship, with master module 304 controlling the function and operation of modules 140 (e.g. slave modules) disposed on other devices.

During synchronization operations, a signal with a selected frequency may be utilized for synchronization. In examples, the frequency may be any suitable frequency used downhole with downhole tool 102 for clock calibration, as discussed above. It should be noted that any frequency may be used which may be out of band with operating frequencies of other devices (to avoid risk of interference) and may not significantly attenuate due to the parasitic impedance of a bus (not illustrated) across downhole tool 102. This frequency may act as the communication channel between master module 304 and any number of other modules 140. When synchronizing, a signal 310, at a selected frequency, may be transmitted from master transmitter 306 disposed on first device 128 to a receiver 302 disposed on second device 130. Receiver 302, disposed on second device 130, may record signal 310 transmitted from master transmitter 306. In examples, signal 310 may comprise frequency that may be a tone sine wave, which may be converted to a square wave at receiver 302. The square wave may then be converted into the required sampling frequency used by the local analog to digital converter. In examples, transmitter 300, (e.g., a tone generator) may be utilized by a device to communicate back to master module 304. During a roundtrip sequence, module 140 may respond to signal 310 from master module 304 by transmitting return signal 312, a second tone, after a fixed time delay. While this occurs, master transmitter 306 may keep track of a master counter which may measure the total time elapsed during synchronization operations. This synchronization process may be repeated from first device 128, designated for controlling synchronization by the operator, to third device 134, fourth device 136, and/or the like. Synchronization may only occur between master transmitter 306 and one module 140 at a time. Thus, master module 304 may synchronize with each module 140 disposed on each individual device before the synchronization operation may be completed.

Figure 5:
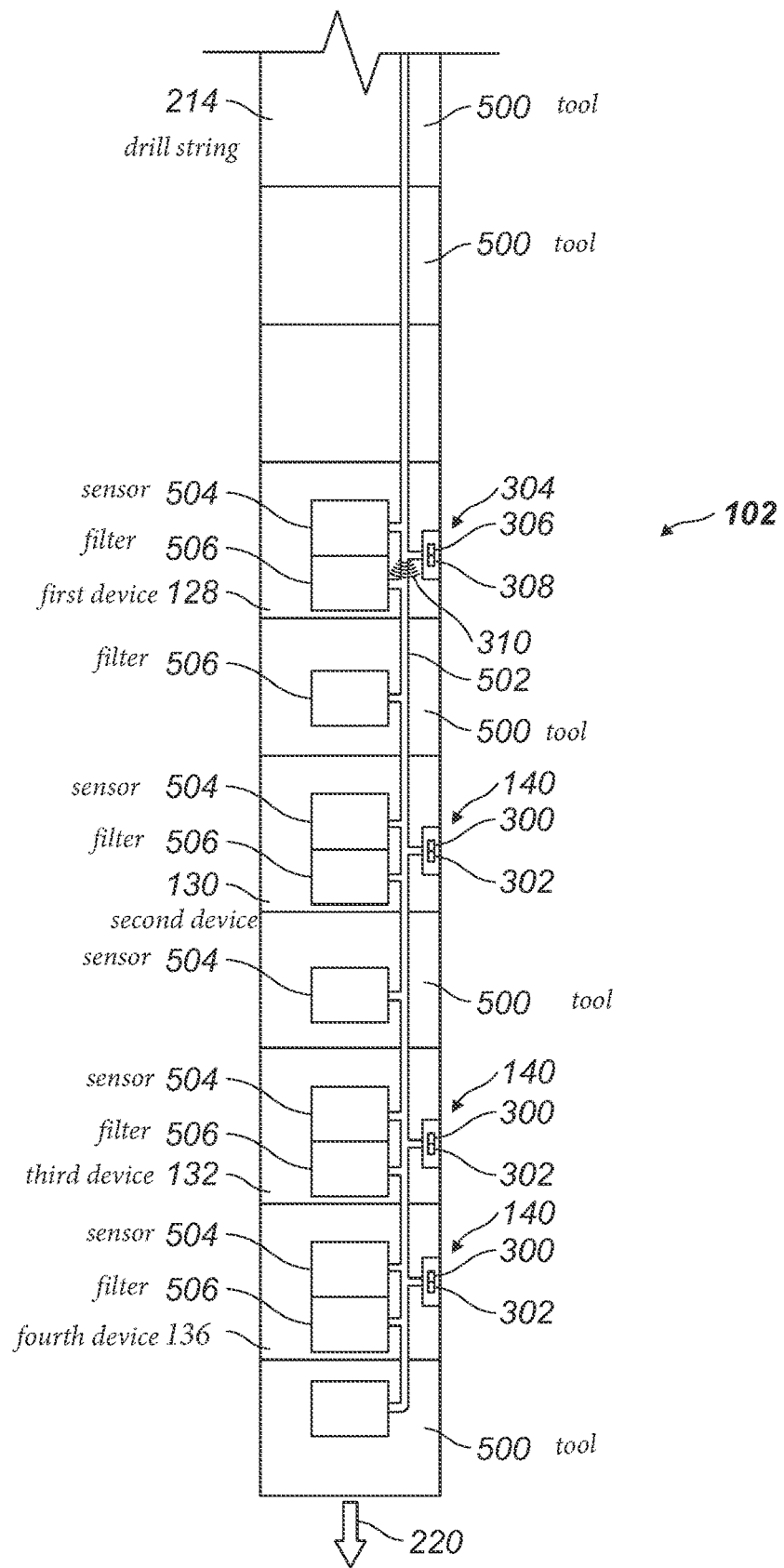
FIG. 5 illustrates a schematic of a well measurement system.

FIG. 5 illustrates an example of a schematic of downhole tool 102 disposed on drill string 214. It should be noted that the schematic of downhole tool 102 may be found on a conveyance 110 (e.g., FIG. 1). As illustrated, a first device 128, a second device 130, a third device 134, and/or a fourth device 136 may be disposed on downhole tool 102 in any suitable matter. For example, first device 128 may be separated from second device 130 by a tool 500. Tool 500 may be any suitable device for use in measuring, sampling, and/or imagining a casing, a formation, and/or mud disposed in borehole 124 (e.g., Referring to FIGS. 1 and 2). It should be noted that tool 500 or a plurality of tools 500 may not comprise a module 140. Tools 500 may be disposed on downhole 102 to perform measurements of borehole 124 and/or subterranean formation 132 but may function, operate, and/or measure independently of first device 128, second device 130, third device 134, and/or a fourth device 136. Thus, tools 500 may be independent and may not need to operate in conjunction with other devices and/or tools.

During operations master module 304 may emit signal 310, a tone, from master transmitter 306 disposed in first device 128. The tone may travel down communication link 502 through first device 128. As the tone travels down communication link 502 in first device 128, signal 310 may encounter a sensor 504 and/or a filter 506, which may slow the travel time of signal 310 as it moves through sensor 504 and/or a filter 506. Signal 310 may continue to travel from first device 128 through tool 500, which may operate independently of first device 128, to second device 130. Traversing through tool 500, signal 310 may travel through filter 506. Signal 310 may be slowed as it passes through sensor 504, filter 506, or any other circuitry that may be found in tool 500 or first device 128, second device 130, third device 134, and/or a fourth device 136. As signal 310 is received by first device 128, second device 130, third device 134, and/or a fourth device 136 though receiver 302 disposed in module 140, module 140 may transmit a return signal 312 from transmitter 300 disposed on module 140. Return signal 140 may be delayed, as discussed above, as it travels through communication link 502 to master module 304 and is received by master receiver 308. The delay may produce a phase difference in measurements between each device. By calibrating internal clocks on each device, the phase difference may be found and used to correct measurements at each device.

Figure 6:
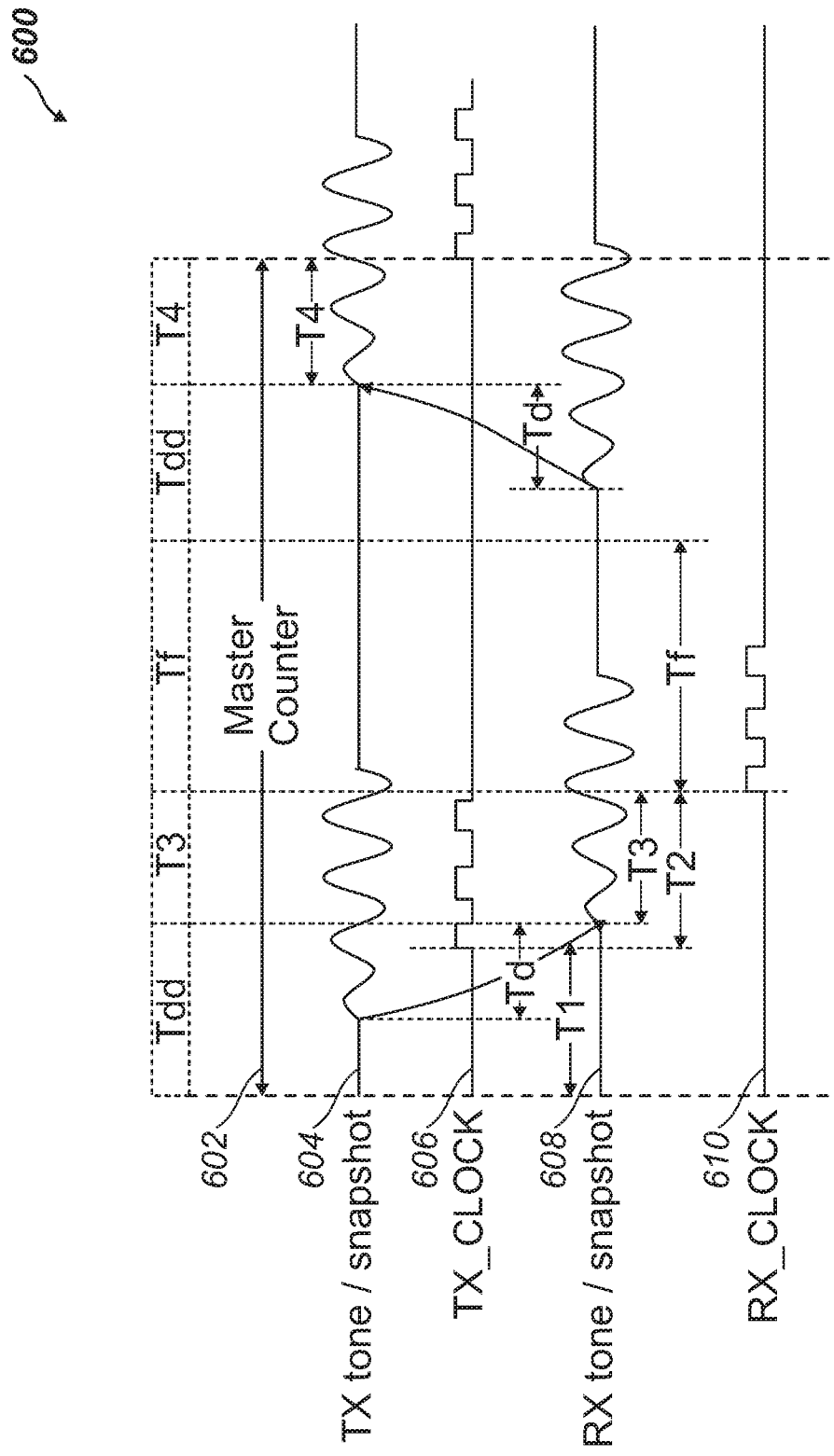
FIG. 6 is a graph of the synchronization process.

FIG. 6 illustrates a timing diagram 600 which demonstrates a roundtrip sequence for synchronization operations. Synchronization operations may begin by a transmitter placing a receiver into a "roundtrip" mode via communication signaling from the transmitter to the receiver that a synchronization operation may begin. In examples, this function and operation may be seen when a master transmitter 306 may communicate with a receiver 302 (e.g., referring to FIG. 3) via communication signaling that a synchronization operation may begin.

Next, a fast pre-processor, communicatively coupled to the transmitter, may start a master counter 602, while the transmitter may simultaneously generating a tone burst in the form of a signal 604 (tone) which may be broadcasted from the transmitter. Without limitation, signal 604 may be broadcasted from master transmitter 306 (e.g., referring to FIG. 3). Any suitable pre-processor may be used. In a non-limiting example, a suitable fast pre-processor may include, field programmable gate array, digital signal processor, microcontroller, and/or the like. In examples, the transmitter may sample its own transmitter clock 606 and latch at $T_1$, which may be defined as a time from signal transmitted to signal detected by a receiver. After some propagation delay (which may be due, e.g., to transmission line, parasitic, and filters) the signal may be received by the receiver. The receiver may latch the digitized received tone 608 (snapshot) into its RAM and receiver clock 610 and apply a fixed time delay, identified as $T_f$. The receiver may then enable its tone generator to generate a return signal. For example, as discussed above, the return signal may be generated from a transmitter 300 which may be communicatively coupled to receiver 302 (e.g., FIG. 3).

During a fixed time delay of $T_f$, the transmitter may change its mode from line driver to a line receiver. After a propagation delay, identified as $T_d$, the return signal is received by the transmitter. Similar to the receiver, the transmitter latches the digitized tone (snapshot) into its RAM and stops master counter 602 upon receiving the digitized tone by sensing the first or $N^{th}$ clock edge.

In examples of a synchronization operations, master counter 602 may be maintained by master transmitter 306 disposed in master module 304 (e.g., Referring to FIG. 3) for the entire roundtrip duration. During the duration of the roundtrip, variables may be defined. These variables may be utilized in equations to measure the time delay between a first device 128, which may comprise master module 304, and second device 130, which may comprise module 140, to correct phase measurements between first device 128 and second device 130. A defined above, the variable $T_1$ may be defined as the time it takes from transmitter tone transmission by a signal to transmitter tone detection at receiver 302 in a module 140. The variable $T_d$ may be defined as a true propagation delay time through the bus-time delay due to transmission line and filters. The fixed time delay of $T_f$ may be further defined as a fixed number of cycles introduced by receiver 302 disposed in module 140, which may be greater than the tone burst period and greater than the propagation delay. At the end of the roundtrip sequence, a snapshot which is latched may be analyzed both by master receiver 308 and receiver 302. The result of this snapshot analysis may allow for times $T_3$ and $T_4$ to be determined. Thus, $T_3$ may be defined as the time from signal transmission to the time receiver 302 detects the signal, which may be defined as a receiver tone snapshot. Additionally, $T_4$ may be defined as the time from signal transmission from receiver 302 to the time master receiver 308 detects the signal, which may be defined as a transmitter tone snapshot. It should be noted that the unit of time for measurements may be pre-processor (FPGA) ticks. In examples, the variable $T_2$ may be determined from the time delay between master transmitter 306 and receiver 302 sampling clocks denoted by $T_2$ in FIG. 4. For example, to determine $T_2$, $T_{dd}$ may be found first. Where $T_{dd}$ is defined as the signal enabled delay with the addition of $T_d$ as shown below:

$$T_{dd} = (\text{Counter} - T_f - T_4 - T_3)/2 \quad (1)$$

The above equation assumes that $T_{dd}$ is equal at master transmitter 306 and receiver 302 (e.g., Referring to FIG. 3). Once $T_{dd}$ is known, $T_2$ may be calculated as seen below:

$$T_2 = T_3 + (T_{dd} - T_1) \quad (2)$$

The time between sampling clocks at $T_2$ may include the combined errors due to transmission line propagation delay, transmission line parasitic and multi-frequency filters, and signal cycles skipped because of the tone detection threshold setting. Further accuracy in measuring $T_2$ may be achieved by measuring the difference in transmitter and receiver clock oscillators. This may be performed by counting the number of transmitter clock ticks for a given clock cycles received when receiver 302 (e.g., Referring to FIG. 4) sends a tone in the form of a signal. In examples, $T_3$ may be measured at a different "edges" of the master clock and $T_4$ may be measured at the same "edge" of the master clock. Additionally, $T_f$ and $T_3$ may be based on a master clock disposed in receiver 302.

In examples, downhole tool 102 (e.g., Referring to FIGS. 1 and 2) may store downhole measurements and diagnostics with information handling system 114. At least a portion of the measurements, as selected by an operator by means of configuration files and/or mode, may be pulsed to surface 108 as real time measurements. In examples, times $T_2$, $T_3$, and $T_4$ may be saved in information handling system 114 when a round trip calibration may be performed. With real time measurements, $T_2$ may be applied to a phase measurement of the firing frequency as a correction in phase as follows:

$$T_2 = (T_2/F_p) \quad (3)$$

where $F_p$ is the pre-processor frequency of ticks in Hz and units of $T_2$ are in seconds. Thus, the phase correction is as follows:

$$P_{error} = 360 \times F_a \times T_2 \quad (4)$$

where $F_a$ is the firing frequency. Additionally, the corrected phase is as follows:

$$P = P_{DFT} - P_{error} \quad (5)$$

where $P_{DFT}$ is the measured phase and $P_{error}$ is in degrees. For example, a receiver response tone may be generated for an extended period of time. After the master counter stops a secondary oscillator calibration counter may be started that counts the transmitter master clock ticks for a given receiver cycles received. As an example, a 32 MHz oscillator 64000 cycles may be obtained in 2 ms. If the oscillators are 200 ppm apart a delta of 13 clock cycles may be measured. Thus, an error adjustment of 13/64000 may be applied to the measurement of $T_2$. The entire roundtrip sequence of a synchronization operation may be completed in less than about 5 ms. Synchronization operations may be repeated a large number of times and a median of the measurements may be utilized for a more precise $T_2$ measurement.

Figure 7:
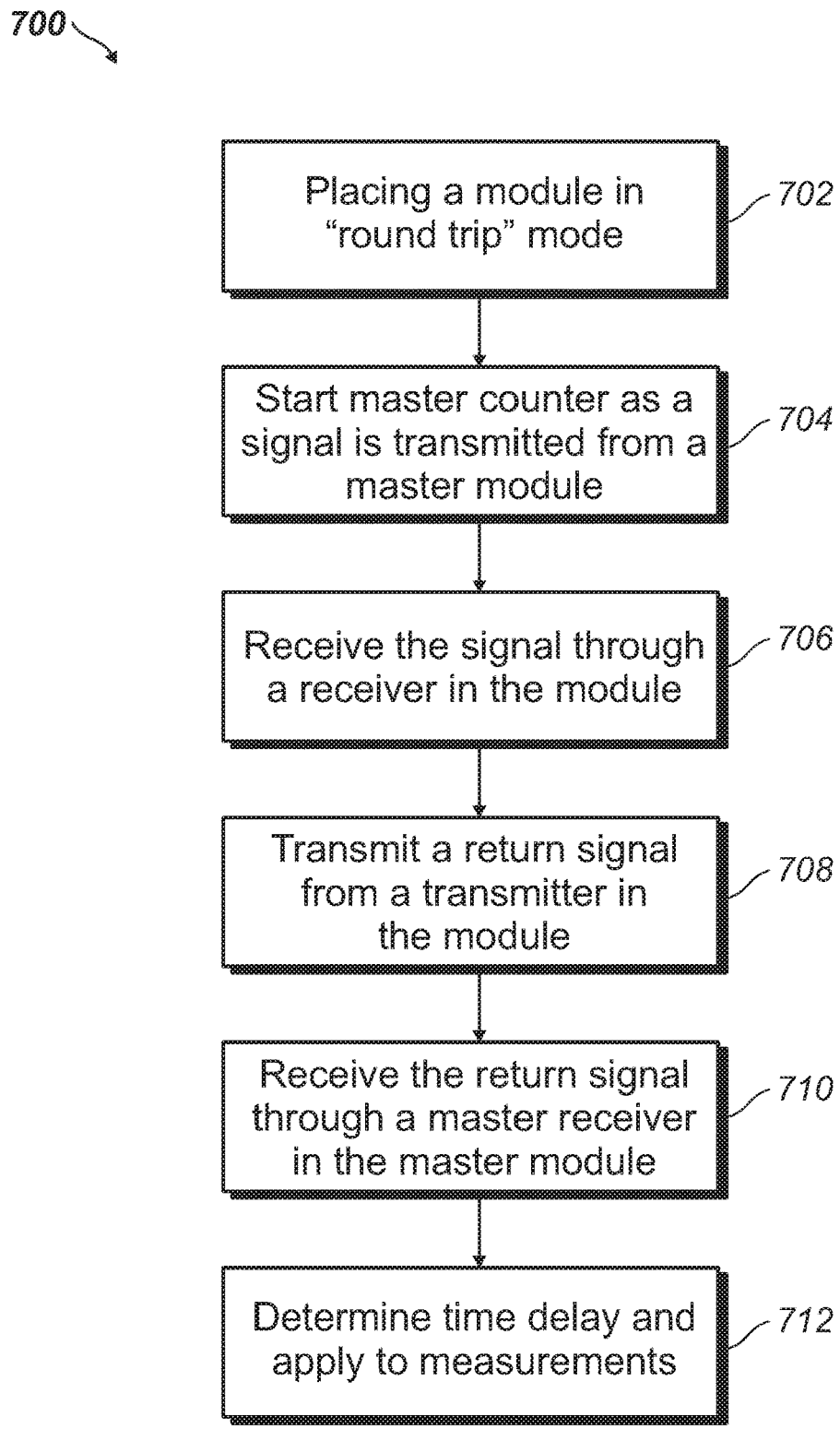
FIG. 7 is a flow chart for synchronizing a well measurement system.

FIG. 7 is a flow chart for synchronization method 700 for a well measurement system 100 (e.g., Referring to FIG. 1) or drilling system 200 (e.g., Referring to FIG. 2). Synchronization method 700 may begin with a first step 702. First step 702 may include master transmitter 306 placing receiver 302 of a module 140 in a "roundtrip" mode via a communication signal. In step 704, a fast pre-processor may start the master counter, while simultaneously generating a tone burst in the form of a signal 310 which may be broadcasted from master transmitter 306. In step 706, the signal 310 may be received by receiver 302 in module 140. Receiver 302 may latch the digitized received signal (snapshot) into its RAM and apply a fixed time delay. In step 708, receiver 302 may then enable its tone generator to generate a return signal 312 from transmitter 300 to master module 304. In step 710, the return signal 312 is received at master receiver 308 in master module 304. Similar to receiver 302, master receiver 306 latches the digitized tone (snapshot) into its RAM and stops the master counter upon receiving the digitized tone by sensing the first or $N^{th}$ clock edge, which determines. In step 712, the measured time delay may be applied to a phase measurement of the firing frequency to correct the phase. It should be noted, as discussed above, the time delay includes one or measurements from propagation delay, phase shifts due to rejection and bandpass filters, and temperature effects.

This method and system may include any of the various features of the compositions, methods, and system disclosed herein, including one or more of the following statements.

Statement 1. A method for calibrating a downhole tool may comprise disposing a downhole tool in a borehole, wherein the downhole tool comprises a first device and a second device, transmitting a signal from a master module disposed on the first device to a module disposed on the second device, transmitting a return signal from the module to the master module, receiving the return signal with the master module, measuring a tone enabled delay for the signal to travel from the master module to the module, and determining a time delay of a return signal to travel from the module to the master module.

Statement 2. The method of statement 1, wherein the master module comprises a master transmitter and a master receiver.

Statement 3. The method of any previous statement, further comprising changing the master module from a line driver controlled by the master transmitter to a line receiver controlled by the master receiver to receive the return signal.

Statement 4. The method of any previous statement, wherein the module comprises a receiver and a transmitter, and wherein the module is capable of changing between a line receiver mode and a line transmitter mode.

Statement 5. The method of any previous statement, further comprising determining the tone enabled delay of $T_{dd}$, wherein $T_{dd} = (\text{Counter} - T_f - T_4 - T_3)/2$, wherein Counter is a time for the signal to travel from the master module to the module and back to the master module as measured by the master module, $T_f$ is a time delay, $T_4$ is a transmitter tone snapshot, and $T_3$ is a receiver tone snapshot.

Statement 6. The method of any previous statement, wherein the time delay is $T_2$, wherein $T_2=T_3+(T_{dd}-T_1)$, wherein $T_1$ is a time it takes for the signal to be transmitted and detected at the master module.

Statement 7. The method of any previous statement, further comprising counting a number of transmitter clock ticks during the time for the signal to travel from the master module to the module and back to the master module.

Statement 8. The method of any previous statement, further comprising applying an error adjustment to the $T_2$.

Statement 9. The method of any previous statement, wherein the signal is 1 hertz to 1 gigahertz.

Statement 10. The method of any previous statement, further comprising measuring resistivity or conductivity of a formation with the first device and/or the second device to obtain a formation property.

Statement 11. The method of any previous statement, further comprising calibrating the formation property with the time delay and displaying a calibrated measurement of the formation property.

Statement 12. The method of any previous statement, wherein the time delay includes one or more measurements from propagation delay, phase shift, and/or or temperature effects.

Statement 13. The method of any previous statement, further comprising applying the time delay to a phase measurement.

Statement 14. A well measurement system may comprise a downhole tool. The downhole tool may further comprise a first device and a master module disposed on the first device, wherein the master module comprises a master transmitter and a master receiver. The downhole tool may further comprise a second device and a module disposed on the second device, wherein the module comprises a transmitter and a receiver. The well measurement system may further comprise an information handling system, wherein the information handling system is configured to control the master module to transmit a signal to the module, change the master module from a line driver controlled by the master transmitter to a line receiver controlled by the master receiver, receive a return signal from the module with the master module, measure a time for the signal to travel from the master module to the module and the return signal back to the master module, and determine a time delay of a return signal to travel from the module to the master module.

Statement 15. The well measurement system of statement 14, wherein the time delay comprises propagation delay, phase shift, and/or or temperature effects.

Statement 16. The well measurement system of statement 14 or statement 15, wherein the information handling system is configured to record a measurement of resistivity or conductivity of a formation from the first device and/or the second device to obtain a formation property.

Statement 17. The well measurement system of statement 14-statement 16, wherein the information handling system is configured to calibrate the formation property with the time delay.

Statement 18. The well measurement system of statement 14-statement 17, further comprising a third device, wherein the third device comprises a second module, and wherein the information handling system is further configured to control the master module to transmit a signal to the second module, change the master module from a line driver controlled by the master transmitter to a line receiver controlled by the master receiver, receive a return signal from the second module with the master module, measure a time for the signal to travel from the master module to the second module and the return signal back to the master module from the second module, and determine a time delay of a return signal to travel from the second module to the master module.

Statement 19. The well measurement system of statement 14-statement 18, wherein the information handling system is configured to record a measurement of resistivity or conductivity a formation from at least one of the first device, the second device, and the third device.

Statement 20. The well measurement system of statement 14-statement 19, wherein the measurement comprises the time delay, and wherein the time delay comprises propagation delay, phase shift, or temperature effects.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

It should further be noted that the term "about" as used herein can allow for a degree of variability in a value or range, for example, within 10%, within 5%, or within 1% of a stated value or of a stated limit of a range, and includes the exact stated value or range.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for calibrating a downhole tool, comprising:
disposing the downhole tool in a borehole, wherein the downhole tool comprises a first device and a second device;
transmitting a signal from a master module disposed on the first device to a module disposed on the second device;
transmitting a return signal from the module to the master module
determining $T_{dd}$ of a time for the signal to travel from the master module to the module, wherein the $T_{dd}$=(Counter-$T_f$-$T_4$-$T_3$)/2, wherein the Counter is a second time for the signal to travel from the master module to the module and back to the master module as measured by the master module, the $T_4$ is a master module signal detection time, the $T_f$ is a fixed time delay and the $T_3$ is a module signal detection time;
determining $T_2$, wherein the $T_2$=$T_3$+($T_{dd}$-$T_1$), wherein the $T_2$ is a time delay and the $T_1$ is a time it takes for the signal to be transmitted and detected at the master module;
receiving the return signal with the master module; and
measuring the time for the signal to travel from the master module to the module.

2. The method of claim 1, wherein the master module comprises a master transmitter and a master receiver.

3. The method of claim 2, further comprising changing the master module from a line driver controlled by the master transmitter to a line receiver controlled by the master receiver to receive the return signal.

4. The method of claim 3, wherein the module comprises a receiver and a transmitter, and wherein the module is capable of changing between a line receiver mode and a line transmitter mode.

5. The method of claim 1, further comprising counting a number of transmitter clock ticks during the second time for the signal to travel from the master module to the module and back to the master module.

6. The method of claim 5, further comprising applying an error adjustment with the $T_2$.

7. The method of claim 1, wherein the signal is 1 hertz to 1 gigahertz.

8. The method of claim 1, further comprising measuring resistivity or conductivity of a formation with the first device and/or the second device to obtain a formation property.

9. The method of claim 8, further comprising:
calibrating the formation property with the time delay; and
displaying a calibrated measurement of the formation property.

10. The method of claim 9, wherein the time delay includes one or more measurements from propagation delay, phase shift, or temperature effects.

11. The method of claim 1, further comprising applying a time delay to a phase measurement.

12. A well measurement system comprising:
a downhole tool, wherein the downhole tool comprises:
a first device;
a master module disposed on the first device, wherein the master module comprises a master transmitter and a master receiver;
a second device;
a module disposed on the second device, wherein the module comprises a transmitter and a receiver; and
an information handling system for:
transmitting a signal to the module,
changing the master module from a line driver controlled by the master transmitter to a line receiver controlled by the master receiver,
transmitting a return signal from the module to the master module
determining $T_{dd}$ of a time for the signal to travel from the master module to the module, wherein the $T_{dd}$=(Counter-$T_f$-$T_4$-$T_3$)/2, wherein the Counter is a second time for the signal to travel from the master module to the module and back to the master module as measured by the master module, the $T_4$ is a master module signal detection time, the $T_f$ is a fixed time delay and the $T_3$ is a module signal detection time,
determining $T_2$, wherein the $T_2$=$T_3$+($T_{dd}$-$T_1$), wherein the $T_2$ is a time delay and the $T_1$ is a time it takes for the signal to be transmitted and detected at the master module,
receiving the return signal from the module with the master module, and
measuring a time for the signal to travel from the master module to the module and the return signal back to the master module.

13. The well measurement system of claim 12, wherein the time delay comprises propagation delay, phase shift, and/or or temperature effects.

14. The well measurement system of claim 12, wherein the information handling system further records a measurement of resistivity or conductivity of a formation from the first device and/or the second device to obtain a formation property.

15. The well measurement system of claim 12, wherein the information handling system further calibrates a formation property with the time delay.

16. The well measurement system of claim 12, further comprising a third device,
wherein the third device comprises a second module, and wherein the information handling system further:
controls the master module to transmit a signal to the second module,
changes the master module from a line driver controlled by the master transmitter to a line receiver controlled by the master receiver,
receives a return signal from the second module with the master module,
measures a time for the signal transmitted to the second module to travel from the master module to the second module and the return signal received from the second module back to the master module from the second module, and
determines the time delay of the signal transmitted to the second module to travel from the master module to the second module.

17. The well measurement system of claim 16, wherein the information handling system further records a measurement of resistivity or conductivity a formation from at least one of the first device, the second device, and the third device.

18. The well measurement system of claim 17, wherein the time delay comprises propagation delay, phase shift, or temperature effects.

19. A method for calibrating a downhole tool, comprising:
- disposing the downhole tool in a borehole, wherein the downhole tool comprises a first device and a second device;
- transmitting a signal from a master module disposed on the first device to a module disposed on the second device;
- transmitting a return signal from the module to the master module after a fixed time delay;
- receiving the return signal with the master module;
- measuring a time for the signal to travel from the master module to the module;
- determining $T_{dd}$ of the time for the signal to travel from the master module to the module, wherein the $T_{dd}=$ (Counter-$T_f$-$T_4$-$T_3$)/2, wherein the Counter is a time for the signal to travel from the master module to the module and back to the master module as measured by the master module, the $T_f$ is the fixed time delay, the $T_4$ is a master module signal detection time, and the $T_3$ is a module signal detection time;
- determining $T_2$, wherein the $T_2=T_3+(T_{dd}-T_1)$, wherein the $T_2$ is a time delay and the $T_1$ is a time it takes for the signal to be transmitted and detected at the master module.

20. A method for calibrating a downhole tool, comprising:
- disposing the downhole tool in a borehole, wherein the downhole tool comprises a first device and a second device;
- transmitting a signal from a master module disposed on the first device to a module disposed on the second device;
- transmitting a return signal from the module to the master module after a fixed time delay;
- receiving the return signal with the master module;
- measuring a time for the signal to travel from the master module to the module;
- determining $T_{dd}$ of the time for the signal to travel from the master module to the module, wherein the $T_{dd}=$ (Counter-$T_f$-$T_4$-$T_3$)/2, wherein the Counter is a time for the signal to travel from the master module to the module and back to the master module as measured by the master module, the $T_f$ is the fixed time delay, the $T_4$ is a master module signal detection time, and the $T_3$ is a module signal detection time;
- determining $T_2$, wherein the $T_2=T_3+(T_{dd}-T_1)$, wherein the $T_2$ is a time delay and the $T_1$ is a time it takes for the signal to be transmitted and detected at the master module; and
- counting a number of transmitter clock ticks during the time for the signal to travel from the master module to the module and back to the master module.

21. A method for calibrating a downhole tool, comprising:
- disposing the downhole tool in a borehole, wherein the downhole tool comprises a first device and a second device;
- transmitting a signal from a master module disposed on the first device to a module disposed on the second device;
- transmitting a return signal from the module to the master module after a fixed time delay;
- receiving the return signal with the master module;
- determining $T_{dd}$ of the time for the signal to travel from the master module to the module, wherein the $T_{dd}=$ (Counter-$T_f$-$T_4$-$T_3$)/2, wherein the Counter is a time for the signal to travel from the master module to the module and back to the master module as measured by the master module, the $T_f$ is the fixed time delay, the $T_4$ is a master module signal detection time, and the $T_3$ is a module signal detection time;
- determining $T_2$, wherein the $T_2=T_3+(T_{dd}-T_1)$, wherein the $T_2$ is a time delay and the $T_1$ is a time it takes for the signal to be transmitted and detected at the master module;
- counting a number of transmitter clock ticks during the time for the signal to travel from the master module to the module and back to the master module; and
- applying an error adjustment with the $T_2$.

\* \* \* \* \*